E. W. TAYLOR.
NUT LOCK.
APPLICATION FILED DEC. 13, 1909.

974,842.

Patented Nov. 8, 1910

Witnesses

Inventor
E. W. Taylor.

By James Sheehy
Attorney

UNITED STATES PATENT OFFICE.

EDWARD W. TAYLOR, OF SALT LAKE CITY, UTAH.

NUT-LOCK.

974,842.  Specification of Letters Patent.  Patented Nov. 8, 1910.

Application filed December 13, 1909. Serial No. 532,842.

*To all whom it may concern:*

Be it known that I, EDWARD W. TAYLOR, a citizen of the United States, residing at Salt Lake City, in the county of Salt Lake and State of Utah, have invented new and useful Improvements in Nut-Locks, of which the following is a specification.

My invention relates to nut locks; and it contemplates the provision of simple and dependable means for locking a nut against turning either on or off a bolt.

Figure 1:
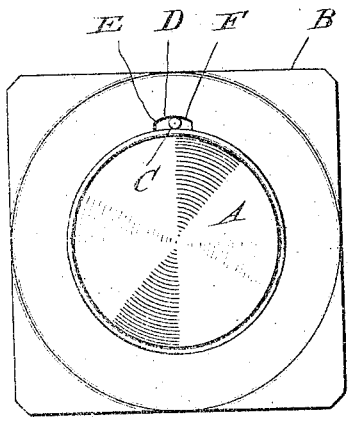
Figure 2:
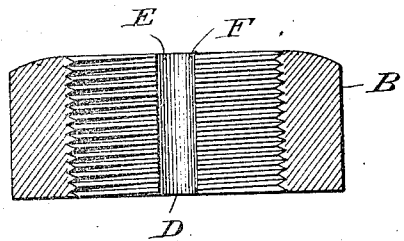

Other advantageous characteristics of the invention will be fully understood from the following description and claim when the same are read in connection with the drawings, accompanying and forming part of this specification, in which:

Figure 1 is an end elevation of a threaded bolt and showing a threaded nut locked against turning in either direction thereon, in accordance with my invention. Fig. 2 is a detail section taken through the nut and showing the novel groove extending throughout the thickness thereof.

Similar letters designate corresponding parts in all of the views of the drawings, referring to which:

A is a bolt of the ordinary threaded type.

B is a nut provided with a thread complementary to that of the bolt and designed to be turned on and off the same in the usual manner, and C is a pin for coöperating with the bolt and the nut to lock the latter to the former and against turning in either direction. To permit of the ready interposition of the pin C between bolt and nut and to enable the pin to serve the purpose stated, the nut is provided in its inner side with a groove D which extends in the direction of its thickness to one of its sides and preferably throughout its thickness, Fig. 2, and is gradually diminished in depth from its longitudinal center to its sides, this in order to afford two reversely arranged cam surfaces E and F. The pin C is of a size in cross-section to enter the comparatively large longitudinal-central portion of the groove D, and may, if desired, be a common wire nail.

In the practical use of my novel nut lock, the nut is turned to the position desired on the bolt, after which the pin is arranged in the longitudinal-central portion of the groove and between the nut and the bolt, as illustrated. With this done, it will be manifest that any tendency of the nut to turn off or toward the left will cause crowding of the pin between the cam surface F and the bolt and stop the nut, and that any tendency of the nut to turn toward the right and farther on the bolt will bring about crowding of the pin between the cam surface E and the bolt, and stop the nut. From this it follows that the pin C will prevent material movement of the nut either inwardly or outwardly on the bolt; also, that the slightest initial turning of the nut in either direction will bind and hold the pin C against being jarred or otherwise casually displaced.

With a view of preventing undue crowding of the pin C against the thread of the bolt, and resultant injury to either pin or thread, I provide the groove D with abrupt side walls, slightly less in depth than the longitudinal center of the groove, as clearly shown in Fig. 1. By virtue of the said abrupt side walls being provided, it is manifestly impossible to crowd the pin C against the thread of the bolt to such an extent as to injure either pin or thread.

The capacity of the lock to prevent turning of the nut in either direction will be appreciated as an important advantage when it is borne in mind that in many cases it is as important to prevent casual movement of a nut inwardly on a bolt as it is to prevent loosening or turning of the nut off the bolt.

It will be gathered from the foregoing that notwithstanding the capacity of my improvement to prevent turning of the nut in either direction, it entails the employment of but one groove and pin and the weakening of the nut at but one point. It will also be noted that the single groove and single pin renders the lock, at once, simple, compact and inexpensive.

Having described my invention, what I claim and desire to secure by Letters Patent, is:

The combination in a nut lock, of a threaded bolt, a threaded nut mounted on the bolt and having in its bore a groove which extends in the direction of the thickness of the nut and to one side thereof and is diminished in depth from its longitudinal center to its opposite sides and is provided with abrupt side walls slightly less in depth than said center and is also provided with reversely arranged cam surfaces intermediate said longitudinal center and side walls, and a pin snugly arranged in the longitudinal-central portion of the groove and between the bolt and the nut, all substantially as and for the purpose specified.

In testimony whereof I have hereunto set my hand in presence of two subscribing witnesses.

EDWARD W. TAYLOR.

Witnesses:
 DELORES McGAUGH,
 SELMA STANFORD.